United States Patent
Yuan

(10) Patent No.: US 12,260,179 B2
(45) Date of Patent: Mar. 25, 2025

(54) INCORPORATING UNSTRUCTURED DATA INTO MACHINE LEARNING-BASED PHENOTYPING

(71) Applicant: Deere & Company, Moline, IL (US)

(72) Inventor: Zhiqiang Yuan, San Jose, CA (US)

(73) Assignee: Deere & Company, Moline, IL (US)

( * ) Notice: Subject to any disclaimer, the term of this patent is extended or adjusted under 35 U.S.C. 154(b) by 184 days.

(21) Appl. No.: 17/737,254

(22) Filed: May 5, 2022

(65) Prior Publication Data
US 2023/0359829 A1    Nov. 9, 2023

(51) Int. Cl.

| | |
|---|---|
| G06F 17/00 | (2019.01) |
| G06F 40/126 | (2020.01) |
| G06F 40/30 | (2020.01) |
| G06N 3/042 | (2023.01) |
| G06N 3/045 | (2023.01) |
| G06V 10/82 | (2022.01) |
| G06V 20/10 | (2022.01) |

(Continued)

(52) U.S. Cl.
CPC ............ G06F 40/30 (2020.01); G06F 40/126 (2020.01); G06N 3/042 (2023.01); G06N 3/045 (2023.01); G06V 10/82 (2022.01); G06V 20/188 (2022.01); G10L 15/1815 (2013.01); G10L 15/22 (2013.01)

(58) Field of Classification Search
CPC ....... G06F 40/30; G06F 40/126; G06V 10/82; G06V 20/188; G06N 3/042; G06N 3/045; G10L 15/22; G10L 15/1815
USPC .......................................................... 704/9
See application file for complete search history.

(56) References Cited

U.S. PATENT DOCUMENTS

| | | |
|---|---|---|
| 5,897,619 A | 4/1999 | Hargrove et al. |
| 9,448,993 B1 | 9/2016 | Braga et al. |

(Continued)

FOREIGN PATENT DOCUMENTS

| | | |
|---|---|---|
| JP | 2003006612 | 1/2003 |
| WO | 2018022301 | 2/2018 |

OTHER PUBLICATIONS

Lee, W.S.; Citrus Yield Mapping System in Natural Outdoor Scenes using the Watershed Transform; dated Jul. 2006.
(Continued)

*Primary Examiner* — Paul C McCord
(74) *Attorney, Agent, or Firm* — Hanley, Flight & Zimmerman, LLC

(57) ABSTRACT

Implementations are described herein for incorporating unstructured data into machine learning-based phenotyping. In various implementations, natural language textual snippet(s) may be obtained. Each natural language textual snippet may describe environmental or managerial features of an agricultural plot that exist during a crop cycle. A sequence-to-sequence machine learning model may be used to encode the natural language snippet(s) into embedding(s) in embedding space. The embedding(s) may semantically represent the environmental or managerial features of the agricultural plot. Using one or more phenotypic machine learning models, phenotypic prediction(s) may be generated about the agricultural plot based on the one or more semantic embeddings and additional structured data about the agricultural plot. Output may be provided at one or more computing devices that is based on one or more of the phenotypic predictions.

20 Claims, 5 Drawing Sheets

(51) Int. Cl.
*G10L 15/18* (2013.01)
*G10L 15/22* (2006.01)

(56) References Cited

U.S. PATENT DOCUMENTS

| | | | |
|---|---|---|---|
| 2005/0192760 | A1 | 9/2005 | Dunlap |
| 2015/0278838 | A1 | 10/2015 | Rasa et al. |
| 2017/0251589 | A1 | 9/2017 | Tippery et al. |
| 2018/0025480 | A1 | 1/2018 | Dingle et al. |
| 2018/0137357 | A1 | 5/2018 | Margalit et al. |
| 2018/0189564 | A1 | 7/2018 | Freitag et al. |
| 2018/0211156 | A1* | 7/2018 | Guan ............... G06N 3/044 |
| 2018/0293671 | A1 | 10/2018 | Murr et al. |
| 2018/0308229 | A1 | 10/2018 | Winkler et al. |
| 2019/0250882 | A1 | 8/2019 | Swansey et al. |
| 2021/0287114 | A1* | 9/2021 | Zhou ............... G06N 5/04 |
| 2022/0335066 | A1* | 10/2022 | Hedayati ............ G06F 16/285 |

OTHER PUBLICATIONS

Calafell, Davinia; Application of image processing methodologies for fruit detection and analysis; Universitat de Lleida; 86 pages;; dated Jul. 2014.
Climate Fieldview—Yield Analysis; Video retrieved from https://www.youtube.com/watch?v=G6M-YGolxeA; dated Nov. 1, 2017.
Google Glass—New Tool for Ag; Video retrieved from https://www.youtube.com/watch?v=drypBC4bzLg; dated Oct. 31, 2014.
Grassi, Mathew; Google Glass: New Tool For Ag; dated Oct. 8, 2014.
Klompenburg, Thomas et al.; Crop yield prediction using machine learning: A systematic literature review; Computers and Electronics in Agriculture; 18 pages; dated 2020.
Devlin et al., "BERT: Pre-Training of Deep Bidirectional Transformers for Language Understanding" arXiv:1810.04805v2 [cs.CL] 16 pages, dated May 24, 2019.
Milos Hauskrecht "Ensamble methods. Mixtures of experts" CS 2750 Machine Learning Lecture 22. 9 pages.
Cedric et al., "Crops yield prediction based on machine learning models: Case of West African Countries" Smart Agricultural Technology 2, 14 pages, dated 2022.
Reedha et al., "Transformer Neural Network for Weed and Crop Classification of High Resolution UAV Images" Remote Sensing. 2022, 14, 592. Retrieved from https://doi.org/10.3390/rs14030592.
Alibabaei et al., "Crop Yield Estimation Using Deep Learning Based on Climate Big Data and Irrigation Scheduling" Energies 2021, 14, 3004. Retrieved from https://doi.org/10.3390/en14113004.
Jubair et al., "GPTransformer: A Transformer-Based Deep Learning Method for Predicting Fusarium Related Traits in Barley" Frontiers in Plant Science, 14 pages. Retrieved from doi:10.3389/fpls.2021.761402. Dated Dec. 16, 2021.
Shahhosseini et al., "Forecasting Corn Yield With Machine Learning Ensembles" Frontiers in Plant Science. 16 pages. 11:1120. doi:10.3389/fpls.2020.01120. Dated Jul. 31, 2020.
Masoudnia et al., "Mixture of Experts: A Literature Survey" ResearchGate. Springer Science+Business Media B.V. 2012, 20 pages. DOI: 10.1007/s10462-012-9338-y.
Geoffrey Hinton, "CSC321: Introduction to Neural Networks and Machine Learning" Lecture 15; Mixtures of Experts. 19 pages.
European Patent Office; International Search Report and Written Opinion issued in Application No. PCT/US2023/020981; 15 pages; dated Jul. 31, 2023.

\* cited by examiner

INCORPORATING UNSTRUCTURED DATA INTO MACHINE LEARNING-BASED PHENOTYPING

BACKGROUND

Phenotypic traits of agricultural plots are typically predicted or estimated (collectively, "inferred") by processing structured agricultural data of known dimensions that is obtained from various sources using statistical and/or machine learning model(s). For example, genotypic data (e.g., crop strains), climate data, sensor data, data about management practices (e.g., irrigation and fertilization practices, crop rotations, tillage practices), and/or soil features are often stored in organized, consistent, and predictable manners, e.g., akin to one or more database schemas. Similarly, images of crops captured by vision sensors often have known dimensions, or at least can be converted into known dimensions using dimensionality reduction techniques. Consequently, phenotypic machine learning model(s) for predicting phenotypic traits can be designed to process inputs of known/static dimensions.

Not every grower has the time, resources, or inclination to methodically gather and organize comprehensive environmental and agricultural management practices into a structured form. The sparser the grower's structured data, the less reliable the phenotypic inferences that are drawn from it. It may be possible to extrapolate and/or interpolate some types of missing data. For example, if a particular grower lacks a particular type of climate sensor, replacement climate values can be interpolated and/or extrapolated from nearby climate sensors, or from publicly-available climate databases. However, the usefulness of interpolated/extrapolated data is limited by its availability and similarity between its origin(s) and the agricultural plot. Data about agricultural management practices is even less susceptible to extrapolation and/or interpolation, given its subjective nature. Moreover, even the most dedicated growers may not capture unstructured agricultural data, such as incidental observations discussing issues like the quality at which agricultural management practices are executed, the experience-informed state of crops, and so forth.

SUMMARY

Implementations are described herein for incorporating unstructured data into machine-learning based pipelines for inferring phenotypic traits of agricultural plots. More particularly, but not exclusively, implementations are described herein for encoding unstructured natural language textual snippets into semantically-rich embeddings in latent space. Those semantically-rich embeddings may then be processed, along with other structured agricultural data, using one or more machine learning models to predict phenotypic traits of agricultural plots, such as crop yield.

Techniques described herein give rise to various technical advantages. Capturing and using unstructured agricultural data as described herein may provide a less cumbersome and/or more practical alternative to methodically gathering comprehensive structured agricultural data. As an example, techniques described herein provide an alternative way to obtain data points that might not otherwise be measured or recorded (e.g., in a spreadsheet) by a grower. Moreover, regardless of how much or what type of structured agricultural data is available, incorporating unstructured agricultural data into phenotypic machine learning pipelines may bolster phenotypic predictions by accounting for additional types of data that might not otherwise be considered, such as grower expertise.

In various implementations, a method may be implemented using one or more processors and may include: obtaining one or more natural language textual snippets, each natural language textual snippet describing one or more environmental or managerial features of an agricultural plot that exist during a crop cycle; using a sequence encoder machine learning model, encoding the one or more natural language snippets into one or more embeddings in embedding space, wherein the one or more semantic embeddings semantically represent the one or more environmental or managerial features of the agricultural plot; using one or more phenotypic machine learning models, generating one or more phenotypic predictions about the agricultural plot based on the one or more semantic embeddings and additional structured data about the agricultural plot; and causing output to be provided at one or more computing devices, wherein the output is based on one or more of the phenotypic predictions.

In various implementations, the sequence encoder machine learning model may include at least part of a transformer network. In various implementations, one or more of the natural language snippets may be obtained from speech recognition output generated using a spoken utterance captured at a microphone. In various implementations, one or more of the natural language snippets may be obtained from electronic correspondence exchanged between two or more individuals associated with the agricultural plot. In various implementations, one or more of the phenotypic predictions may be crop yield.

In various implementations, the one or more phenotypic machine learning models may be a mixture of experts ensemble that includes: a first phenotypic expert model to encode the one or more natural language textual snippets into the one or more embeddings, and a second phenotypic expert model to process the structured data about the agricultural plot. In various implementations, the mixture of experts may include a third phenotypic expert model that is used to process outputs of the first and second phenotypic expert models. In various implementations, the third phenotypic expert model may be a gating network. In various implementations, the gating network may be trained to assign relative weights to outputs of the first and second phenotypic expert models.

In various implementations, the structured data may include sensor data gathered by one or more sensors carried through the agricultural plot by one or more agricultural vehicles. In various implementations, the sensor data may include image data captured by one or more vision sensors carried by one or more of the agricultural vehicles, and one or more of the phenotypic predictions may be generated by processing the image data using one or more convolutional neural networks.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to enable performance of any of the aforementioned methods. Some implementations also include one or more non-transitory computer readable storage media storing computer instructions executable by one or more processors to perform any of the aforementioned methods.

DETAILED DESCRIPTION

Figure 1:
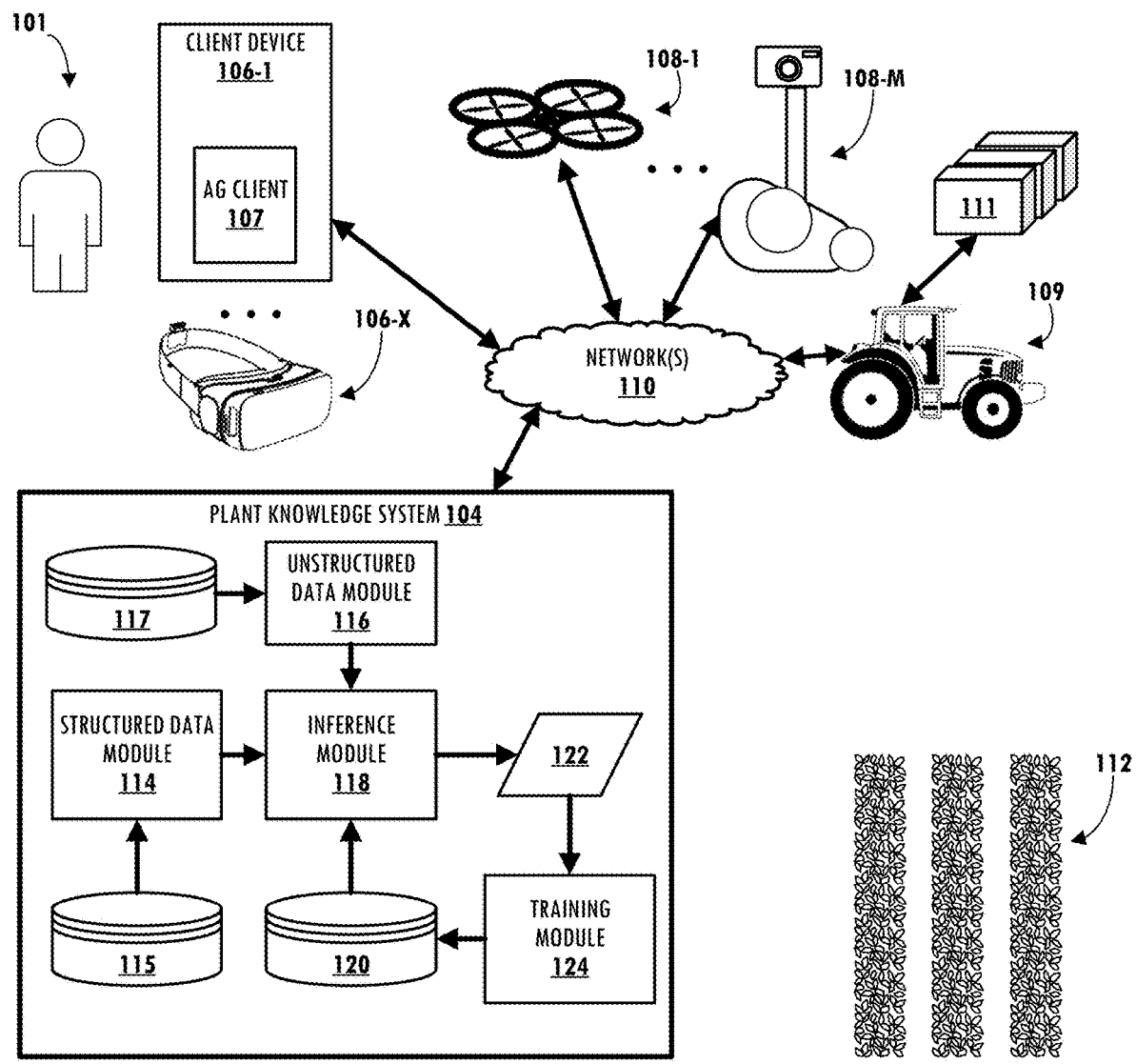
FIG. 1 schematically depicts an example environment in which selected aspects of the present disclosure may be employed in accordance with various implementations.

Implementations are described herein for incorporating unstructured data into machine-learning based pipelines for inferring phenotypic traits of agricultural plots. More particularly, but not exclusively, implementations are described herein for encoding unstructured natural language textual snippets into semantically-rich embeddings in latent space. Those semantically-rich embeddings may then be processed, along with other structured agricultural data, using one or more machine learning models to predict phenotypic traits of agricultural plots, such as crop yield.

Techniques described herein give rise to various technical advantages. Capturing and using unstructured agricultural data as described herein may provide a less cumbersome and/or more practical alternative to methodically gathering comprehensive structured agricultural data. As an example, techniques described herein provide an alternative way to obtain data points that might not otherwise be measured or recorded (e.g., in a spreadsheet) by a grower. Moreover, regardless of how much or what type of structured agricultural data is available, incorporating unstructured agricultural data into phenotypic machine learning pipelines may bolster phenotypic predictions by accounting for additional types of data that might not otherwise be considered, such as grower expertise.

Unstructured agricultural data may include agricultural data that is not in a predictable or consistent form, at least natively. A primary example includes natural language textual snippets that are generated and/or captured from, for instance, spoken utterances, electronic correspondence, contracts, or other sources of natural language that are relevant to an agricultural plot. In various implementations, unstructured agricultural data may be encoded into semantically-rich embeddings using one or more sequence encoder machine learning models. In some cases, these semantically-rich embeddings may have known dimensions. Consequently, they can be processed, along with structured agricultural data about an agricultural plot, using phenotypic machine learning models to make phenotypic predictions.

In some implementations, the sequence encoder machine learning model may be a sequence-to-sequence model such as an encoder-decoder (sometimes referred to as an "auto-encoder"). Once trained, the encoder portion may be used subsequently to generate the semantically-rich embeddings. Some examples of sequence encoder machine learning models include recurrent neural networks, long short-term memory (LSTM) networks, residual neural networks, and/or gated recurrent unit (GRU) networks, to name a few. More recently, large language models such as transformer networks have become increasingly popular for performing natural language processing, and may be used to generate semantic embeddings as described herein.

Transformer networks were designed in part to mitigate a variety of shortcomings of prior natural language processing models, such as overfitting, the vanishing gradient problem, and exceedingly high computational costs, to name a few. A transformer network may take the form of, for instance, a BERT (Bidirectional Encoder Representations from Transformers) transformer and/or a GPT (Generative Pre-trained Transformer). In various implementation, such a transformer model may be trained (e.g., "conditioned" or "boot-strapped") using one or more corpuses of documents and other data that is relevant to the agriculture domain generally (e.g., worldwide), or to subdomains of the agricultural domain (e.g., regions having homogenous climates). These documents may include, for instance, academic papers, agricultural textbooks, agricultural presentations, scientific studies, historic agricultural narratives, and so forth.

In various implementations, a machine learning-based phenotypic pipeline configured with selected aspects of the present disclosure may be used as follows. Natural language textual snippets generated during a crop cycle of crops grown in an agricultural plot of interest may be obtained from various sources. These sources may include, for instance, spoken utterances of agricultural personnel, electronic correspondence (e.g., emails, text messages, social media posts, direct messages, etc.) to or from agricultural personnel, contracts, invoices, or other documents pertaining to agricultural management practices (e.g., contracts to perform agricultural or ecosystem services), and so forth. In some implementations, snippets may be organized based on, and/or flagged with, the date and/or time (e.g., timestamp) of their creation. These natural language snippets may then be encoded into semantically-rich embeddings using the aforementioned sequence encoder machine learning model.

In some implementations where there are multiple semantic embeddings (e.g., because there were multiple different natural language textual snippets), the multiple semantic embeddings may be combined into a unified semantic embedding, e.g., via concatenation, averaging, addition, etc. The unified semantic embedding may semantically and collectively represent the unstructured agricultural data contained across each of the natural language textual snippets.

Additionally or alternatively, in some implementations, the unified embedding may be created using another sequence encoder machine learning model (e.g., various types of RNNs, transformers, etc.). For example, multiple semantically-rich embeddings (each representing an encoding of a different natural language textual snippet) may be iteratively processed using such a model as a sequence of inputs, e.g., in temporal order. Various mechanisms such as internal memory or state, or self-attention, may ensure that all semantic embeddings of the sequence are accounted for in the resulting unified embedding.

In some implementations where the textual snippets are flagged with timestamps, the textual snippets and/or their corresponding embeddings may be organized into temporal chunks or bins, e.g., along with temporally-correspondent structured agricultural data. The number of temporal chunks or bins may depend on factors such as the temporal frequency at which the natural language textual snippets were generated/captured, the granularity of other structured agricultural data, etc. For example, if all or a significant portion of structured agricultural data available for the agricultural plot takes the form of daily time series data, then the textual snippets and/or their corresponding embeddings may be grouped into days. Structured and unstructured agricultural data contained in the same temporal bin may then be processed together, e.g., so that the unstructured agricultural data can provide temporally-relevant context to the structured agricultural data.

In any case, once semantically-rich embedding(s) representing unstructured agricultural data are generated, one or more phenotypic machine learning models of the machine-learning based phenotypic pipeline may be used to process the semantically-rich embedding(s) and additional structured data about the agricultural plot to generate phenotypic prediction(s) about the agricultural plot. While any number of phenotypic predictions are possible, examples described herein will largely refer to predicting crop yield.

In some implementations, a phenotypic model may be adapted to include—on top of inputs already provided for receiving structured data—additional inputs for receiving semantically-rich embedding(s). Additionally or alternatively, in some implementations, an ensemble of phenotypic machine learning models may be included in the phenotypic pipeline, some to process structured agricultural data and others to process unstructured agricultural data. Models of the ensemble may be trained individually and/or jointly.

For example, the phenotypic pipeline may include a "mixture of experts" ensemble of "expert" models and "gating" models. Some expert models may be trained to process structured agricultural data. As an example, a convolutional neural network (CNN) may be trained to process images captured by vision sensors carried through agricultural plots by agricultural vehicles and/or personnel, e.g., to annotate those images with inferred phenotypic traits and/or to make phenotypic predictions such as crop yield. Other machine learning models (e.g., neural networks, RNNs, LSTMs, etc.) may be trained to process other types of structured (e.g., time-series) data, such as data scraped from a spreadsheet or database, sensor data captured in situ, etc., to make phenotypic predictions.

Other expert models may be trained to process unstructured agricultural data, such as natural language textual snippets and/or their corresponding semantically-rich embeddings. For example, the aforementioned sequence encoder machine learning model (e.g., RNN, LSTM, transformer) may be trained to encode natural language textual snippets into semantically-rich embeddings of known dimensions. Another sequence encoder machine learning model may be provided to process sequences of semantically-rich embeddings into a unified embedding, as described previously.

Gating models (sometimes referred to as "gating networks") may be trained to select and/or assign relative weights to outputs generated by the various expert models. For example, a gating model may be trained to process both (a) a semantic embedding (unified or otherwise) generated using a first expert model and (b) output of other expert model(s) that process structured agricultural data. The gating model may determine which expert model(s) should be trusted to generate the most accurate output, how the outputs of the expert models should be combined, how much weight should be assigned to output of each expert model, whether predictions made based on structured agricultural data should be boosted based on corroborative unstructured agricultural data, etc.

In some implementations, the gating model may be trained to assign more weight to an embedding generated from unambiguous natural language input, such as "I watered the plot for 15 minutes every day last month," or "we applied 40 kg of pesticide across the northwest field this morning." Contrastly, the gating model may assign less weight to an embedding generated from ambiguous natural language input, such as "I kept the workers busy watering the field," or "we watered regularly last week." Ambiguity of natural language inputs—or unstructured data more generally—may be determined in various ways, such as via confidence measures generated by the sequence encoder machine learning models, distances of semantic embeddings in latent space to known concepts, presence/absence of numeric values in the natural language inputs, presence, absence, and/or scope of temporal identifiers (e.g., "yesterday" is less vague than "last week"), etc.

Additionally or alternatively, in some implementations, the gating model may be trained to provide, in effect, a sliding scale between structured and unstructured data. For example, if structured data for given agricultural practice (e.g., crop rotation) is available, natural language textual snippets related to that same agricultural practice may be weighted less heavily. On the other hand, if available structured data is sparse, unstructured data (e.g., embeddings generated from natural language textual snippets) may be weighted more heavily to make up for the sparseness of the structured data. If structured and unstructured data contradict each other, in some implementations, the gating model may be trained to favor structured data over unstructured data, or to assign them relative weights according to historical accuracy of their origins.

FIG. 1 schematically illustrates an environment in which one or more selected aspects of the present disclosure may be implemented, in accordance with various implementations. The example environment includes one or more agricultural plots 112 and various sensors that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural plots(s) 112 may be used to grow various types of crops that may produce plant parts of economic and/or nutritional interest. Agricultural plots(s) 112 may have various shapes and/or sizes. In the United States, for instance, it is common to organize a larger field into smaller plots, each with two rows. In some implementations, phenotypic trait estimation models may be applied on a plot-by-plot basis to estimate aggregate trait values for individual plots.

An individual (which in the current context may also be referred to as a "user" or "grower") may operate one or more client devices 106-1 to 106-X to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") 106-X that provides an AR or VR immersive computing experience, a "smart" watch, and so forth. Additional and/or alternative client devices may be provided.

Plant knowledge system 104 is an example of an information system in which the techniques described herein may be implemented. Each of client devices 106 and plant knowledge system 104 may include one or more memories for storage of data and software applications, one or more processors for accessing data and executing applications, and other components that facilitate communication over a network. The operations performed by client device 106 and/or plant knowledge system 104 may be distributed across multiple computer systems.

Each client device 106 may operate a variety of different applications that may be used to perform various agricultural tasks, such as crop yield prediction. For example, a first client device 106-1 operates agricultural ("AG") client 107 (e.g., which may be standalone or part of another application, such as part of a web browser). Another client device 106-X may take the form of a HMD that is configured to render 2D and/or 3D data to a wearer as part of a VR immersive computing experience. For example, the wearer of client device 106-X may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

In some implementations, one or more robots 108-1 to 108-M and/or other agricultural vehicles 109 may be deployed and/or operated to perform various agricultural tasks. These tasks may include, for instance, harvesting, irrigating, fertilizing, chemical application, trimming, pruning, sucker/bud removal, etc. An individual robot 108-1 to 108-M may take various forms, such as an unmanned aerial vehicle 108-1, a robot (not depicted) that is propelled along a wire, track, rail or other similar component that passes over and/or between crops, a wheeled robot 108-M, a rover that straddles a row of plants (e.g., so that the plant pass underneath the rover), or any other form of robot capable of being propelled or propelling itself past crops of interest.

In some implementations, different robots may have different roles, e.g., depending on their capabilities. For example, in some implementations, one or more of robots 108-1 to 108-M may be designed to capture various types of sensor data (e.g., vision, temperature, moisture, soil characteristics), others may be designed to manipulate plants or perform physical agricultural tasks, and/or others may do both. Robots 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, lasers, barometers (for local weather information), photodiodes (e.g., for sunlight), thermometers, soil sensors, etc. This sensor data may be organized as structured agricultural data, e.g., in database(s) in accordance with known/consistent schemas, in spreadsheets, in organized textual files (e.g., comma-delimited, tab-delimited), etc.

In addition to or instead of robots, in some implementations, agricultural vehicles 109 such as the tractor depicted in FIG. 1, center pivots, boom sprayers (which may be affixed to tractors or other agricultural vehicles), threshers, etc. may be leveraged to acquire various sensor data. For example, one or more modular computing devices 111 (also referred to as "sensor packages") may be mounted to agricultural vehicle 109 and may be equipped with any number of sensors, such as one or more vision sensors that capture images of crops, or other sensors such as soil sensors, moisture sensors, thermometers, etc. These sensor data may be collected and, as described previously, organized as structured agricultural data.

In various implementations, plant knowledge system 104 may be implemented across one or more computing systems that may be referred to as the "cloud". Plant knowledge system 104 may receive sensor data generated by robots 108-1 to 108-M, modular computing devices 111, and/or agricultural personnel and process it using various techniques to perform tasks such as making phenotypic predictions 122, e.g., on a plot-by-plot basis. In various implementations, plant knowledge system 104 may include a structured data module 114, an unstructured data module 116, an inference module 118, and a training module 124. In some implementations one or more of modules 114, 116, 118, 124 may be omitted, combined, and/or implemented in a component that is separate from plant knowledge system 104.

Structured data module 114 may be configured to obtain structured agricultural data from various sources, such as modular computing device(s) 111, robots 108-1 to 108-M, agricultural vehicle 109, databases of recorded agricultural data (e.g., logs), etc. Structured data module 114 may provide these data to inference module 118. Similarly, unstructured data module 116 may be configured to obtain unstructured agricultural data from various sources, and provide these data to inference module 118. In other implementations, structured data module 114 and/or unstructured data module 116 may be omitted and the functions described herein as being performed by structured data module 114 and/or unstructured data module 116 may be performed by other components of plant knowledge system 104, such as inference module 118.

Plant knowledge system 104 may also include one or more databases. For example, plant knowledge system 104 may include, in communication with structured data module 114, a structured database 115 for storing structured agricultural data. Structured agricultural data may include any data that is collected and organized, e.g., by structured data module 114, in a consistent and predictable manner. One example is sensor data collected by robots 108-1 to 108-M and/or other agricultural vehicles 109. Another example of structured agricultural data may be data that is input by agricultural personnel into spreadsheets, input forms, etc., such that the data is collected and organized, e.g., by structured data module 114, in a consistent and/or predictable manner. For example, growers may maintain logs of how and/or when various management practices (e.g., irrigation, pesticide application, herbicide application, tillage) were performed. Other examples of structured agricultural data may include, for instance, satellite data, climate data from publicly-available databases, and so forth.

Similarly, plant knowledge system 104 may include, in communication with unstructured data module 116, an unstructured database 117 for storing unstructured agricultural data. Unstructured agricultural data may include any data that is collected, e.g., by unstructured data module 116, from sources that are not organized in any consistent or predictable manner. These sources may include, for instance, natural language textual snippets obtained from a variety of sources. As one example, AG client 107 may provide an interface for a user 101 to record spoken utterances. These utterances may be stored as audio recordings, transcribed into text via a speech-to-text (STT) process and then stored, and/or encoded into embeddings and then stored. Other potential sources of natural language textual snippets include, but are not limited to, documents such as contracts and invoices, electronic correspondence (e.g., email, text messaging), periodicals such as newspapers (e.g., reporting floods or other weather events that can impact crops), and so forth. Documents may be obtained, e.g., by unstructured data module 116, from sources such as a client device 106.

Plant knowledge system 104 may also include a machine learning model database 120 that includes one or more machine learning models that are trained as described herein to make phenotypic predictions 122, such as crop yield. In this specification, the term "database" and "index" will be used broadly to refer to any collection of data. The data of the database and/or the index does not need to be structured in any particular way and it can be stored on storage devices in one or more geographic locations.

Inference module 118 may be configured to process structured agricultural data obtained by structured data module 114 and unstructured agricultural data obtained by unstructured data module 116 using various machine learning models stored in machine learning model database 120 to generate output indicative of phenotypic predictions 122. These phenotypic predictions may come in various forms, such as estimated aggregate traits of plots, crop yield, recommendations, and so forth. Various types of machine learning models may be trained for use in performing selected aspects of the present disclosure. For example, a sequence encoder machine learning model such as an encoding portion of a transformer language model may be trained to generate semantically-rich embeddings from unstructured agricultural data. Various types of phenotypic machine learning models, or ensembles of phenotypic models, may be trained to make phenotypic predictions based on structured agricultural data and semantically-rich embeddings generated from unstructured agricultural data.

During one or more training phases, training module 124 may be configured to train any of the aforementioned models (or portions thereof) using ground truth and/or observed phenotypic traits. For example, training module 124 may train the sequence encoder machine learning model initially using a corpus of agricultural documents and data, as described previously. In some implementations, training module 124 may train the sequence encoder machine learning model using similarity and/or metric learning techniques such as regression and/or classification similarity learning, ranking similarity learning, locality sensitive hashing, triplet loss, large margin nearest neighbor, etc.

In some implementations, training module 124 may also train phenotypic machine learning models to make phenotypic predictions using the semantically-rich embeddings generated using the sequence encoder machine learning model and structured agricultural data. Suppose a particular agricultural plot 112 yields 1,000 units of a plant-trait-of-interest. Images of crops in that particular agricultural plot, captured sometime in the crop cycle prior to harvest, may be processed using a crop yield estimation machine learning model to predict crop yield. The crop yield estimation machine learning model may also be used to process, as additional inputs, one or more semantically-rich embeddings generated by the sequence encoder machine learning model. This predicted crop yield may then be compared, e.g., by training module 124, to the ground truth crop yield to determine an error. Based on this error, training module 124 may train one or more of the machine learning models in database 120, e.g., using techniques such as back propagation and gradient descent.

Figure 2:
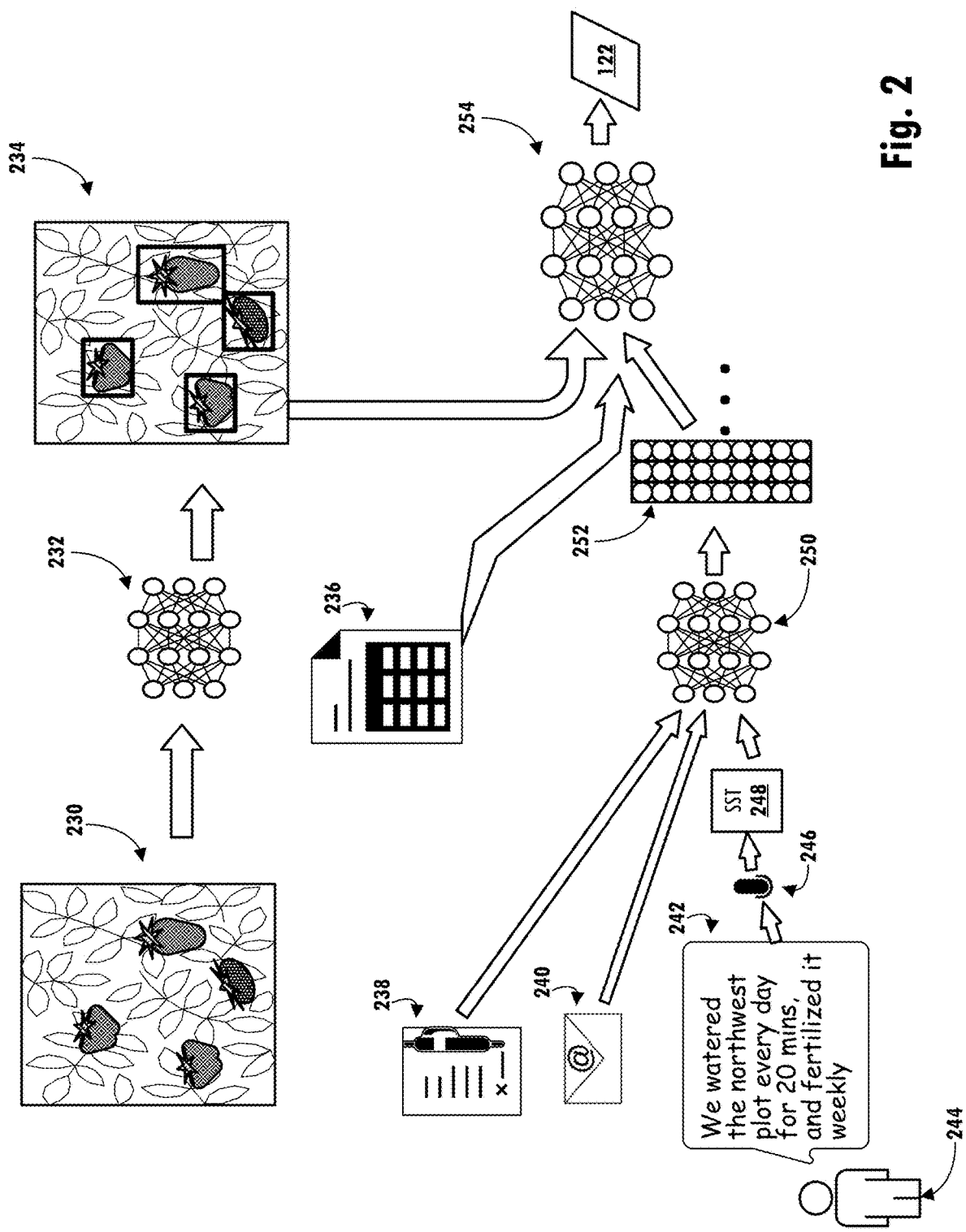
FIG. 2 schematically depicts an example of how techniques described herein may be implemented to make phenotypic predictions using both structured and unstructured data, in accordance with various implementations.

FIG. 2 schematically depicts an example of how machine learning models may be applied to make phenotypic predictions about agricultural plots using both structured and unstructured agricultural data. One source of structured agricultural data in this example is an image 230 of a plant that includes four plant-parts-of-interest (strawberries in this example). Across the top of FIG. 2, image 230 and/or others like it may be processed using one phenotypic machine learning model 232, which in this example is a dense prediction model trained to annotate detected strawberries with bounding boxes. The result is an annotated image 234. Another source of structured agricultural data in this example is a spreadsheet 236 of agricultural data. Spreadsheet 236 may include various structured agricultural data, such as a log of agricultural managerial practices (e.g., fertilizer, irrigation, chemicals, tillage, etc.), soil sample records, record of detected pests or disease, etc. Other sources of structured agricultural data are contemplated.

Various sources of unstructured agricultural data are depicted in FIG. 2 as well. One example is a contract 238 to perform some agricultural task on the agricultural plot of interest. Such an agricultural task may include, for instance, an ecosystem service (e.g., carbon sequestration, cover crop, erosion prevention, etc.), harvesting of a crop, planting of a crop, tillage of the agricultural plot, treatment of a crop with fertilizer or other chemicals, weed remediation, pest remediation, disease remediation, etc. Contract 238 may include textual snippet(s) that describe aspect(s) of the agricultural task to be performed, conditions for satisfying the contract, etc.

Another source of unstructured agricultural data includes electronic correspondence, such as email 240. Email 240 (or other electronic correspondence) may convey information between relevant parties, such as between growers and employees, between growers and contractors, between employees of growers, etc. For example, employees may email growers with information such as incidental observations, reports on tasks performed and details of those tasks, requests for materials and/or chemicals, invoices, etc. Electronic correspondence need not be electronic natively; in some cases, paper correspondence may be processed using optical character recognition (OCR) to generate electronic correspondence.

Another source of unstructured agricultural data includes one or more utterances 242 by a person 244. In various implementations, these utterances 242 may be captured at one or more microphones 246 and processed using a STT component 248 to generate natural language textual snippets. Utterances 242 can vary widely in subject matter, level of detail, etc. Utterances 242 may include, for example, incidental observations about the agricultural plot of interest by agricultural personnel. Suppose an employee makes a statement such as "It looks like we might have some culm rot going on." This utterance may be considered by downstream component(s), e.g., along with other evidence, to make or boost a phenotypic prediction that culm rot is, in fact, present in the agricultural plot of interest.

The unstructured data collected, e.g., by unstructured data module 116 from various sources 238, 240, 242, may be processed by inference module 118 (not depicted in FIG. 2) using a sequence encoder machine learning model 250 to generate one or more semantically-rich embeddings 252. As mentioned previously, sequence encoder machine learning model 250 may take various forms, such as an encoder portion of a transformer network that is trained on agricultural documents and/or agricultural data. As shown by the arrows in FIG. 2, semantically-rich embedding(s) 252 may then be processed by inference module 118 using another phenotypic machine learning model 254, along with structured agricultural data, such as annotated image(s) 234 and/or spreadsheet 236, to make a phenotypic prediction 122. The phenotypic prediction 122 may take the form of, for instance, a crop yield prediction, a recommendation for which crop to plant next to maximize future yield (or for other purposes), etc.

Figure 3A:
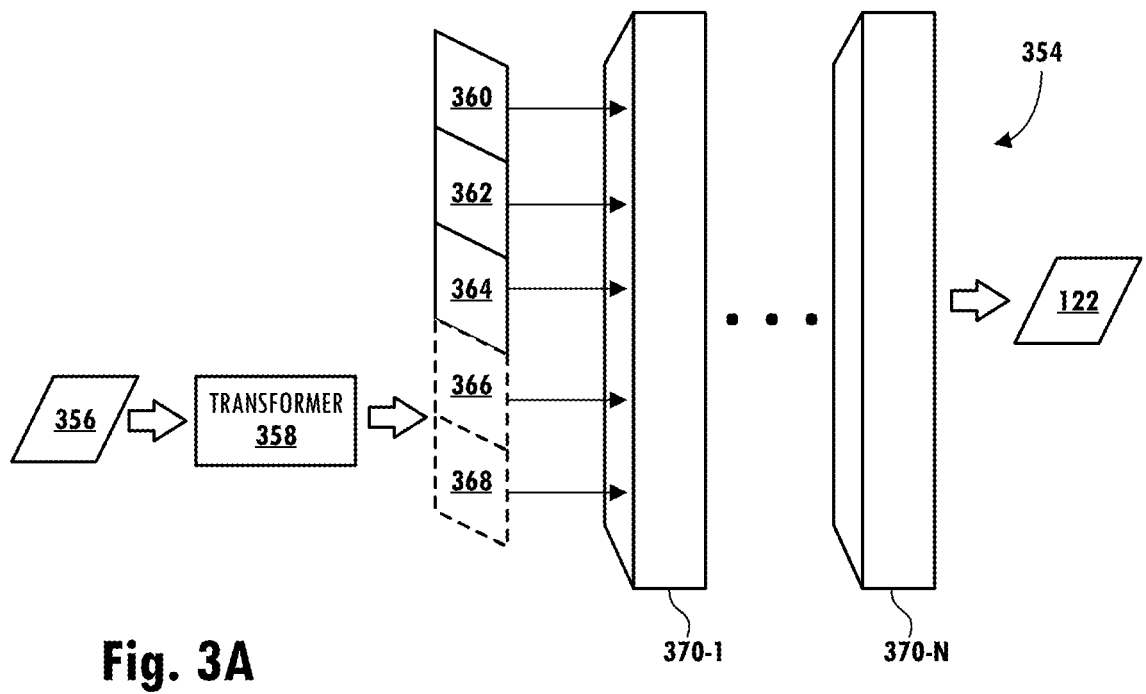
FIG. 3A and FIG. 3B schematically depict different examples of how structured and unstructured data may be processed to make phenotypic predictions, in accordance with various implementations.
Figure 3B:
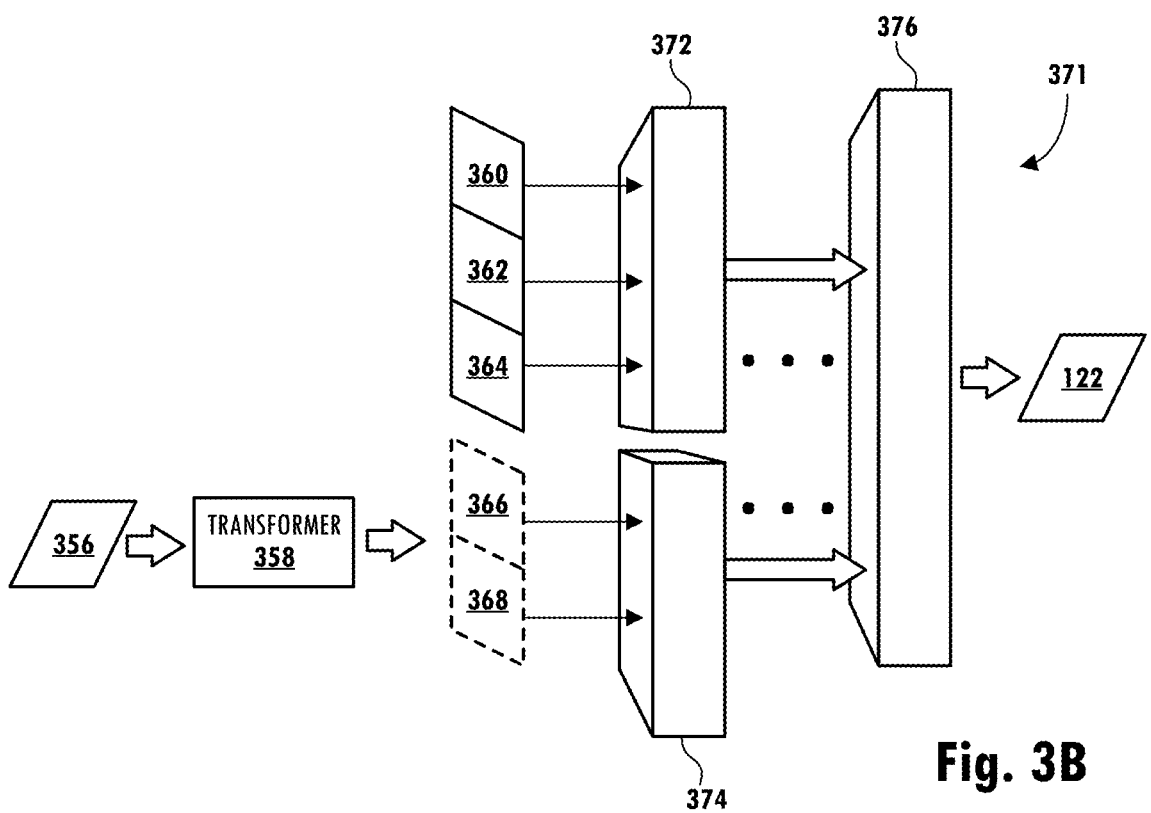

FIGS. 3A and 3B schematically depict examples of how different phenotypic pipelines may be implemented to practice selected aspects of the present disclosure. In FIG. 3A, unstructured data 356 is processed by a transformer 358 (or at least an encoder portion thereof) that corresponds to sequence encoder machine learning model 250 of FIG. 2 to generate semantically-rich embeddings 366 and 368 (outlined in dashes to indicate that they originate as unstructured agricultural data). Inference module 118 (not depicted in FIG. 3) may then apply various pieces of structured agricultural data 360, 362, 364 across a phenotypic machine learning model 354, along with semantically-rich embeddings 366, 368, to make a phenotypic prediction 122. As indicated by the ellipses, phenotypic machine learning model 354 may include any number of layers 370-1 to 370-N. Notably, in this example, phenotypic machine learning model 354 may be a single model that is adapted to process both structured and unstructured agricultural data as inputs.

In other examples, by contrast, an ensemble of phenotypic machine learning models may be included in a phenotypic pipeline, some to process structured agricultural data and others to process unstructured agricultural data. Models of the ensemble may be trained individually and/or jointly. An example of this is depicted in FIG. 3B. As was the case in FIG. 3A, unstructured data 356 is processed by a transformer 358 corresponding to sequence encoder machine learning model 250 in FIG. 2 to generate semantically-rich embeddings 366, 368.

However, the phenotypic pipeline in FIG. 3B features a mixture of experts 371 that includes a first expert machine learning model 372 to process pieces of structured data 360, 362, 364 and a separate, second expert machine learning model 374 to process semantically-rich embeddings 366, 368. The mixture of experts 371 may also include a gating network 376 (which can be a single layer or multiple layers) to process the outputs of models 372, 374. Gating network 376 may be trained to assign relative weights to the outputs of models 372, 374 in order to make the phenotypic prediction. As mentioned previously, gating network 376 may be trained to assign these relative weights based on, for instance, a measure of ambiguity of the unstructured data 356, and/or based on aspects of structured data 360, 362, 364, such as its temporal, spatial, or spectral (in the case of images) resolution.

Figure 4:
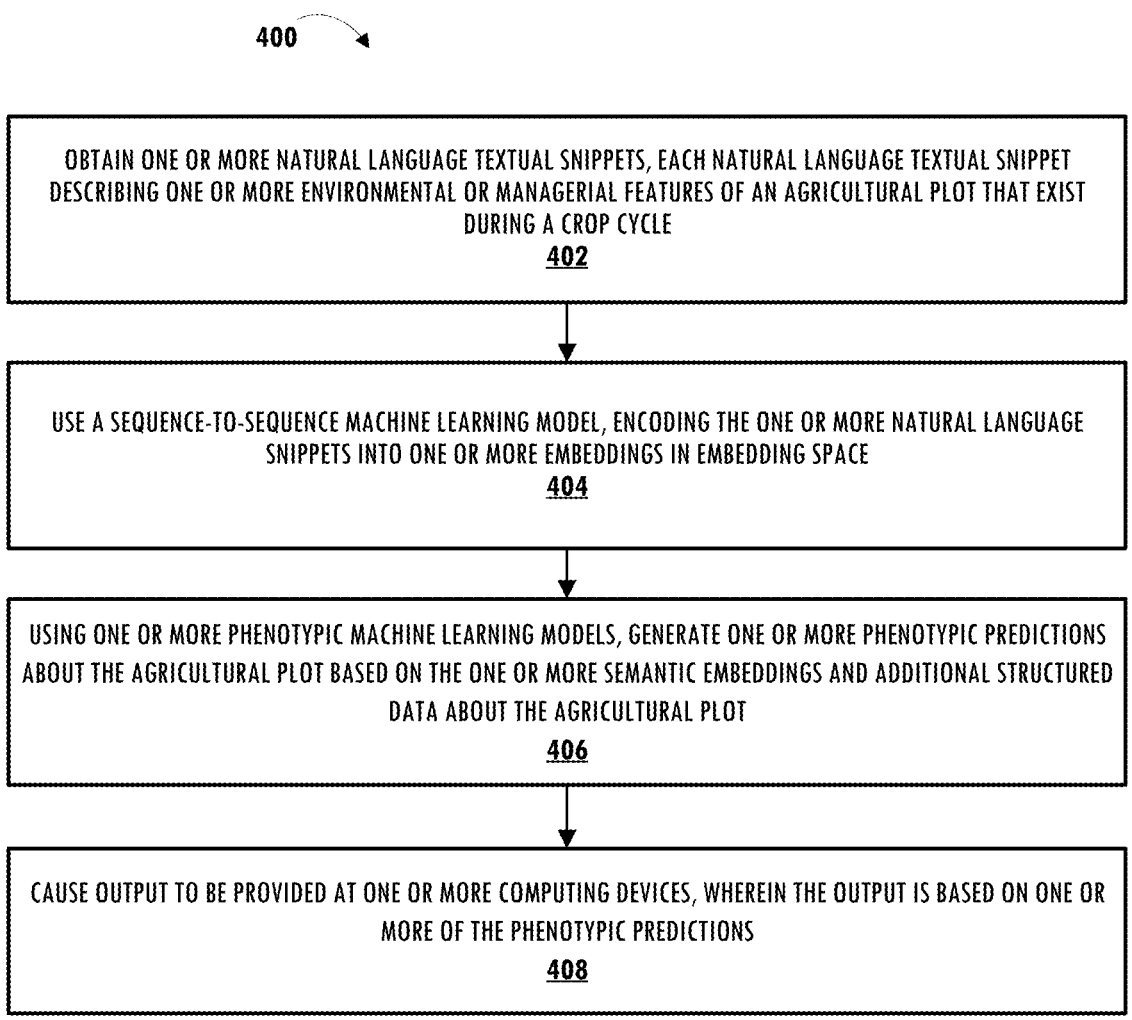
FIG. 4 is a flowchart of an example method in accordance with various implementations described herein.

FIG. 4 illustrates a flowchart of an example method 400 for practicing selected aspects of the present disclosure during an inference phase. The operations of FIG. 4 can be performed by one or more processors, such as one or more processors of the various computing devices/systems described herein, such as by plant knowledge system 104. For convenience, operations of method 400 will be described as being performed by a system configured with selected aspects of the present disclosure. Other implementations may include additional operations than those illustrated in FIG. 4, may perform step(s) of FIG. 4 in a different order and/or in parallel, and/or may omit one or more of the operations of FIG. 4.

At block 402, the system, e.g., by way of unstructured data module 116, may obtain one or more natural language textual snippets. Each natural language textual snippet may describe one or more environmental or managerial features of an agricultural plot that exist during a crop cycle. Environmental features of the agricultural plot may include, for instance, incidental observations about conditions of the crops, soil, weather, sunlight, pest infestation, disease, presence or absence of weeds, etc. Managerial features of the agricultural plot may include, for instance, statements or incidental observations about agricultural tasks performed in the field. With irrigation, for instance, an agricultural worker may comment on how much water was applied over the plot, when the water was applied, how frequently water is applied, etc. Workers may make similar comments about application of other substances, such as fertilizers, pesticides, herbicides, etc. Other managerial practices may include, for instance, tillage, cover crops, crop rotation, etc. And as mentioned previously, natural language snippets may come from other sources as well, such as correspondence, contracts, invoices, reports, etc.

At block 404, the system, e.g., by way of inference module 118, may use a sequence encoder machine learning model to encode the one or more natural language snippets into one or more embeddings in embedding space. In various implementations, the one or more semantic embeddings may semantically represent the one or more environmental or managerial features of the agricultural plot. In some implementations where there are multiple natural language textual snippets (from a single source or from multiple sources), the individual semantic embeddings generated therefrom may be combined into a unified embedding, e.g., using techniques such as concatenation, averaging, a sequence-to-sequence model, etc.

At block 406, the system, e.g., by way of inference module 118, may use one or more phenotypic machine learning models to generate one or more phenotypic predictions about the agricultural plot based on the one or more semantic embeddings, as well as based on additional structured data about the agricultural plot. Examples of using both unstructured and structured data were depicted in FIGS. 2 and 3A-B.

At block 408, the system may cause output to be provided at one or more computing devices, such as at AG client 107 of client device 106-1. The output may be based on one or more of the phenotypic predictions. For example, a phenotypic prediction of crop yield may be presented to a user (e.g., 101) at AG client 107, e.g., as natural language output, as part of a larger report, on demand, etc. In some implementations, other phenotypic inferences may be augmented with one or more of the phenotypic predictions. For example, the annotated image 234 in FIG. 2 may be further annotated, e.g., with projected crop yield for the depicted plants or the entire agricultural plot in which the depicted plants grow.

Figure 5:
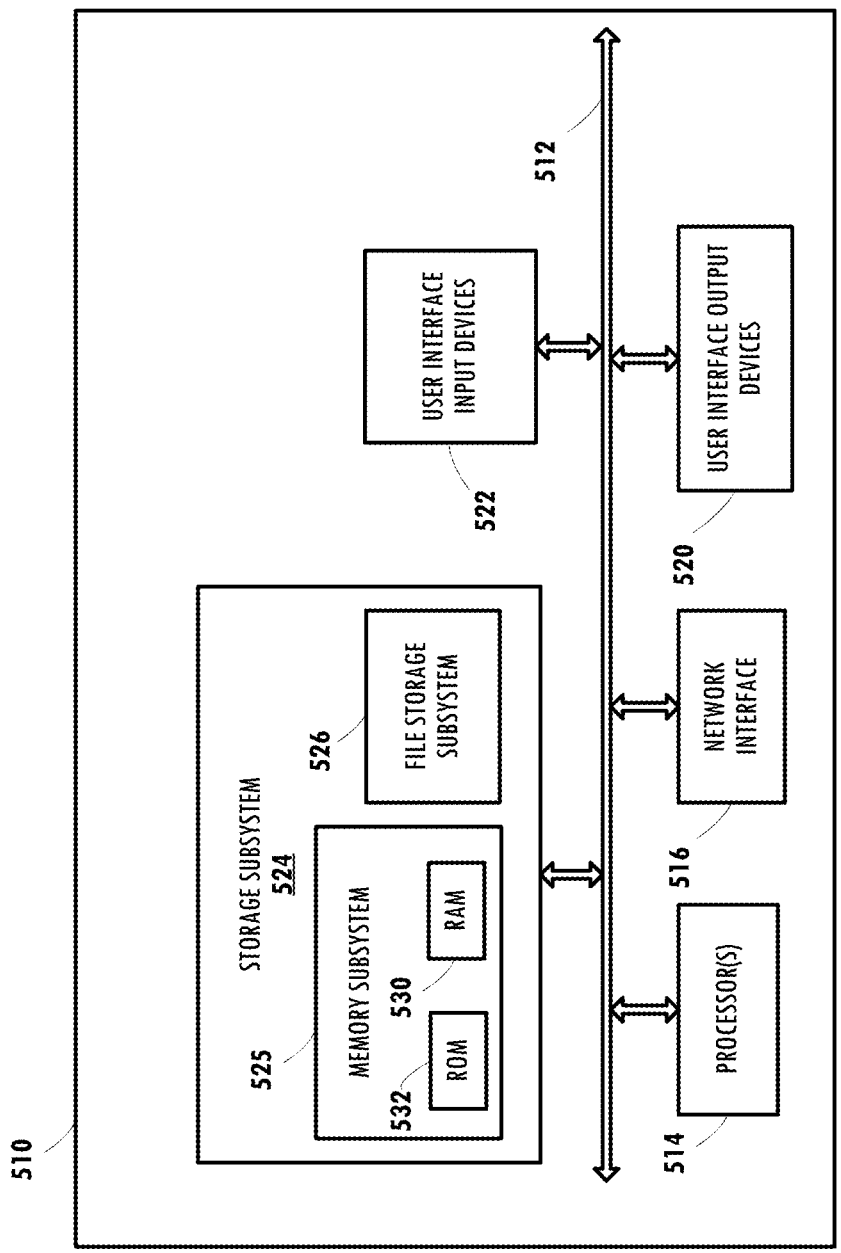
FIG. 5 schematically depicts an example architecture of a computer system.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 510 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of method 400 described herein, as well as to implement various components depicted in FIGS. 1-3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple buses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:
obtaining one or more natural language textual snippets, each natural language textual snippet describing one or more environmental or managerial features of an agricultural field that exist during a crop cycle;
encoding, using a sequence encoder machine learning model, the one or more natural language snippets into one or more semantic embeddings in embedding space, wherein the one or more semantic embeddings semantically represent the one or more environmental or managerial features of the agricultural field;
quantifying an amount of ambiguity of the encoding of the one or more natural language snippets into the one or more embeddings;
generating, using one or more phenotypic machine learning models one or more phenotypic predictions about the agricultural field based on the one or more semantic embeddings, the amount of ambiguity, and additional structured data about the agricultural field, the one or more phenotypic machine learning models to assign a greater weight to a first semantic embedding generated from an unambiguous natural language snippet than to a second semantic embedding generated from an ambiguous natural language snippet, wherein the structured data includes sensor data gathered by one or more sensors carried through the agricultural field by one or more agricultural vehicles, and the one or more of the phenotypic predictions are generated using the sensor data; and
causing output to be provided at one or more computing devices, wherein the output is based on one or more of the phenotypic predictions.

2. The method of claim 1, wherein the sequence encoder machine learning model includes at least part of a transformer network.

3. The method of claim 1, wherein one or more of the natural language snippets is obtained from speech recognition output generated using a spoken utterance captured at a microphone.

4. The method of claim 1, wherein one or more of the natural language snippets is obtained from electronic correspondence exchanged between two or more individuals associated with the agricultural field.

5. The method of claim 1, wherein one or more of the phenotypic predictions comprises crop yield.

6. The method of claim 1, wherein the one or more phenotypic machine learning models include comprise a mixture of experts ensemble that includes:
- a first phenotypic expert model to encode the one or more natural language textual snippets into the one or more embeddings, and
- a second phenotypic expert model to process the structured data about the agricultural field.

7. The method of claim 6, wherein the mixture of experts further includes a third phenotypic expert model that is used to process outputs of the first and second phenotypic expert models.

8. The method of claim 7, wherein the third phenotypic expert model includes a gating network.

9. The method of claim 1, wherein the sensor data includes image data gathered by one or more vision sensors carried through the agricultural field by the one or more agricultural vehicles.

10. The method of claim 9, wherein the processing of the image data is performed using one or more convolutional neural networks.

11. A system comprising one or more processors and memory storing instructions that, in response to execution of the instructions, cause the one or more processors to:
- obtain one or more natural language textual snippets, each natural language textual snippet describing one or more environmental or managerial features of an agricultural field that exist during a crop cycle;
- encode, using a sequence encoder machine learning model, the one or more natural language snippets into one or more semantic embeddings in embedding space, wherein the one or more semantic embeddings semantically represent the one or more environmental or managerial features of the agricultural field;
- quantify an amount of ambiguity of the encoding of the one or more natural language snippets into the one or more embeddings;
- generate, using one or more phenotypic machine learning models, one or more phenotypic predictions about the agricultural field based on the one or more semantic embeddings, the amount of ambiguity, and additional structured data about the agricultural field, the one or more phenotypic machine learning models to assign a greater weight to a first semantic embedding generated from an unambiguous natural language snippet than to a second semantic embedding generated from an ambiguous natural language snippet, wherein the structured data includes sensor data gathered by one or more sensors carried through the agricultural field by one or more agricultural vehicles, and the one or more of the phenotypic predictions are generated using the sensor data; and
- cause output to be provided at one or more computing devices, wherein the output is based on one or more of the phenotypic predictions.

12. The system of claim 11, wherein the sequence encoder machine learning model includes at least part of a transformer network.

13. The system of claim 11, wherein one or more of the natural language snippets is obtained from speech recognition output generated using a spoken utterance captured at a microphone.

14. The system of claim 11, wherein one or more of the natural language snippets is obtained from electronic correspondence exchanged between two or more individuals associated with the agricultural field.

15. The system of claim 11, wherein one or more of the phenotypic predictions comprises crop yield.

16. The system of claim 11, wherein the one or more phenotypic machine learning models includes a mixture of experts ensemble that includes:
- a first phenotypic expert model to encode the one or more natural language textual snippets into the one or more embeddings, and
- a second phenotypic expert model to process the structured data about the agricultural field.

17. The system of claim 16, wherein the mixture of experts further includes a third phenotypic expert model that is used to process outputs of the first and second phenotypic expert models.

18. The system of claim 17, wherein the third phenotypic expert model includes a gating network.

19. A non-transitory computer-readable medium comprising instructions that, in response to execution of the instructions by a processor, cause the processor to:
- obtain one or more natural language textual snippets, each natural language textual snippet describing one or more environmental or managerial features of an agricultural field that exist during a crop cycle;
- encode, using a sequence encoder machine learning model, the one or more natural language snippets into one or more semantic embeddings in embedding space, wherein the one or more semantic embeddings semantically represent the one or more environmental or managerial features of the agricultural field;
- quantify anamount of ambiguity of the encoding of the one or more natural language snippets into the one or more embeddings;
- generate, using one or more phenotypic machine learning models, one or more phenotypic predictions about the agricultural field based on the one or more semantic embeddings, the amount of ambiguity, and additional structured data about the agricultural field, the one or more phenotypic machine learning models to assign a greater weight to a first semantic embedding generated from an unambiguous natural language snippet than to a second semantic embedding generated from an ambiguous natural language snippet, wherein the structured data includes sensor data gathered by one or more sensors carried through the agricultural field by one or more agricultural vehicles, and the one or more of the phenotypic predictions are generated using the sensor data; and
- cause output to be provided at one or more computing devices, wherein the output is based on one or more of the phenotypic predictions.

20. The method of claim 1, wherein the quantification of the amount of ambiguity is based on at least one of a presence, absence, or scope of temporal identifiers included in the natural language snippet.

* * * * *

UNITED STATES PATENT AND TRADEMARK OFFICE
CERTIFICATE OF CORRECTION

PATENT NO. : 12,260,179 B2
APPLICATION NO. : 17/737254
DATED : March 25, 2025
INVENTOR(S) : Yuan Page 1 of 1

It is certified that error appears in the above-identified patent and that said Letters Patent is hereby corrected as shown below:

In the Claims

Column 15, Claim 6, Line 8, delete "comprise".

Signed and Sealed this
Sixth Day of May, 2025

Coke Morgan Stewart
*Acting Director of the United States Patent and Trademark Office*